United States Patent
Young

(10) Patent No.: US 6,392,388 B1
(45) Date of Patent: May 21, 2002

(54) METHOD OF HEATING AN AUTOMOTIVE BATTERY IN COLD ENVIRONMENTS

(75) Inventor: Colin Jeffrey Young, Dearborn, MI (US)

(73) Assignee: Ford Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/848,496

(22) Filed: May 3, 2001

(51) Int. Cl.[7] .......................... H02J 7/00; H01M 10/50
(52) U.S. Cl. ............................ 320/150; 429/7; 429/62
(58) Field of Search ........................... 320/150; 429/7, 429/62

(56) References Cited

U.S. PATENT DOCUMENTS

| | | | |
|---|---|---|---|
| 2,418,792 A | 4/1947 | Riggs | 136/161 |
| 2,516,048 A | 7/1950 | Endress | 136/161 |
| 2,710,937 A | 6/1955 | Godshalk et al. | 320/2 |
| 2,938,066 A | 5/1960 | Weigand | 136/161 |
| 3,440,109 A | 4/1969 | Plattner | 136/161 |
| 3,512,071 A | 5/1970 | Daniels | 320/5 |
| 3,623,916 A | 11/1971 | Toyooka et al. | 136/161 |
| 3,654,426 A | 4/1972 | Brinkmann et al. | 219/209 |
| 3,809,526 A | 5/1974 | Nordli et al. | 432/36 |
| 5,039,927 A | 8/1991 | Centafanti | 320/2 |
| 5,362,942 A | 11/1994 | Vanderslice, Jr. et al. | 219/209 |
| 5,508,126 A | 4/1996 | Braun | 429/7 |
| 5,599,636 A | 2/1997 | Braun | 429/7 |
| 5,756,227 A | 5/1998 | Suzuki et al. | 429/62 |
| 5,789,092 A | 8/1998 | Spiers et al. | 429/24 |
| 5,834,131 A | 11/1998 | Lutz et al. | 429/7 |
| 6,002,240 A | 12/1999 | McMahan et al. | 320/150 |

Primary Examiner—Gregory Toatley
(74) Attorney, Agent, or Firm—Dykema Gossett PLLC; Carlos L. Hanze

(57) ABSTRACT

A circuit and method for controlling a battery (12) are provided. The circuit (18) includes a switching device (24) disposed between first and second poles (20, 22) of the battery (12) and responsive to a control signal. The circuit also includes a controller (26) that generates the control signal in accordance with a predetermined algorithm responsive to a temperature and a voltage drop across poles (20, 22). The inventive method includes the step (30) of providing a switching device (24) between first and second poles (20, 22) of battery (12). The method further includes the step (34) of controlling switching device (24) responsive to a temperature and a voltage drop across poles (20, 22).

20 Claims, 2 Drawing Sheets

METHOD OF HEATING AN AUTOMOTIVE BATTERY IN COLD ENVIRONMENTS

FIELD OF THE INVENTION

This invention relates to vehicle batteries and, in particular, to a method and apparatus for controlled heating of vehicle batteries.

BACKGROUND OF THE INVENTION

It is well known that the operation of batteries in vehicles is affected by ambient temperature. As ambient temperature drops, the internal voltage of these conventional batteries decreases and the internal resistance rises. As a result, conventional batteries can become incapable of operating in accordance with their intended functions (e.g., starting the vehicle engine) if the temperature is too low.

In order to overcome the affects of low ambient temperatures, a variety of devices have been developed to warm batteries responsive to low temperatures. Available battery power is dependent on the battery's charge condition in addition to temperature, however, and conventional devices fail to take account of the charge condition of the battery. As a result, conventional devices are subject to inefficiencies because warming of the battery is handled in the same manner regardless of the battery's charge condition.

There is thus a need for a circuit and a method for controlling a battery that will minimize or eliminate one or more of the above-mentioned deficiencies.

SUMMARY OF THE INVENTION

The present invention provides a circuit and a method for controlling a battery.

A circuit in accordance with the present invention includes a switching device disposed between first and second poles of the battery and responsive to a control signal. When closed, the switching device shorts the battery thereby generating heat due to internal resistance of the battery. The circuit also includes a controller that generates the control signal in accordance with a predetermined algorithm responsive to a temperature of the battery and a voltage drop across the first and second poles of the battery.

A method for controlling a battery in accordance with the present invention includes the step of providing a switching device between first and second poles of the battery. The method further includes the step of controlling the switching device responsive to a temperature and a voltage drop across the first and second poles of the battery. The step of controlling the switching device may include several substeps including the substeps of measuring the temperature and the voltage drop across the poles of the battery and comparing the measured temperature and voltage drop to a predetermined temperature and voltage drop, respectively. The controlling step may further include the substep of closing the switching device whenever the measured temperature and voltage drop meet predetermined characteristics relative to the predetermined temperature and voltage drop. For example, the switching device may be closed when the measured temperature is less than the predetermined temperature and the measured voltage drop is greater than the predetermined voltage drop.

A battery control circuit and method in accordance with the present invention represent a significant improvement as compared to conventional battery control devices and methods. In particular, the inventive circuit and method warm the battery responsive to both a temperature and the charge condition of the battery in a highly controlled manner. As a result, unnecessary warming of the battery is minimized and operating efficiencies improved.

These and other advantages of this invention will become apparent to one skilled in the art from the following detailed description and the accompanying drawings illustrating features of this invention by way of example.

DETAILED DESCRIPTION OF THE PREFERRED EMBODIMENT

Figure 1:
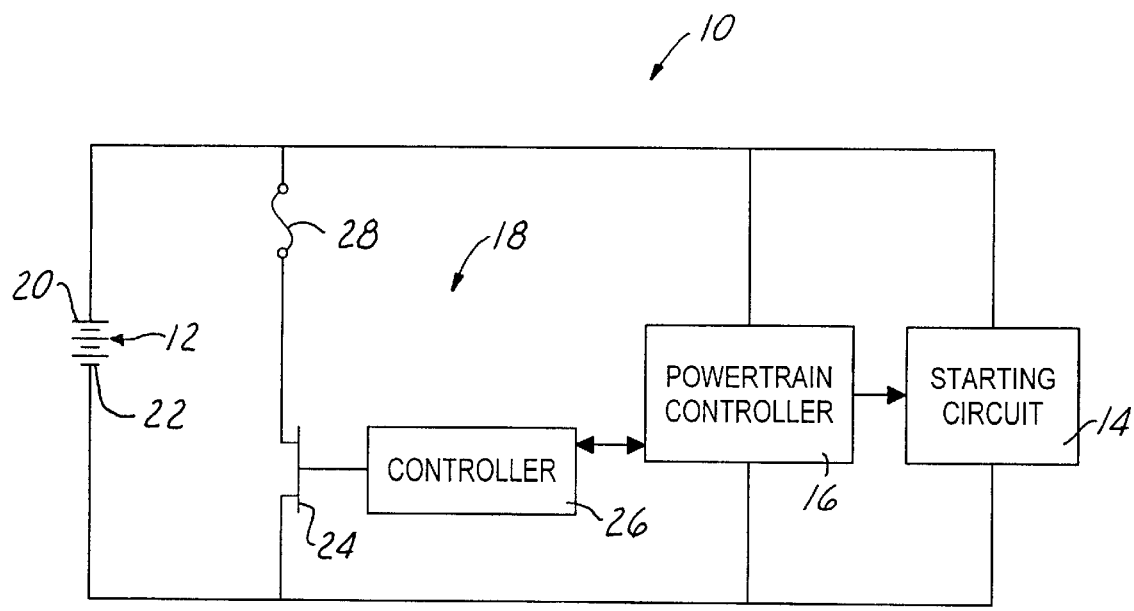
FIG. 1 is a schematic and block diagram illustrating a vehicle control circuit including a circuit for controlling a battery in accordance with the present invention.

Referring now to the drawings wherein like reference numerals are used to identify identical components in the various views, FIG. 1 illustrates a vehicle control circuit 10. Circuit 10 is provided to control the operation of a vehicle and may include a battery 12, a starting circuit 14, a powertrain controller 16, and a circuit 18 for controlling battery 12 in accordance with the present invention.

Battery 12 provides electrical power to the vehicle. Battery 12 is conventional in the art and may comprise a nickel-cadmium battery, lithium polymer battery or other conventional battery. Battery 12 includes first and second poles 20, 22.

Starting circuit 14 is provided to start the vehicle. In the illustrated embodiment, circuit 14 comprises an electronically controlled starting circuit. Circuit 14 may alternatively, however, comprise a conventional key-switched starting circuit. Circuit 14 is responsive to commands generated by powertrain controller 16 and, when closed, circuit 14 draws current from battery 12.

Powertrain controller 16 is provided to control elements of the vehicle powertrain and is conventional in the art. Controller 16 may comprise a microcontroller operating under the control of a set of programming instructions (i.e., software). In addition to the powertrain, controller 16 may generate control signals used to control the operation of starting circuit 14 and control circuit 18. Controller 16 may also receive input signals from circuit 18 to direct the operation of starting circuit 14 and other components of the vehicle.

Control circuit 18 is provided to control battery 12 and, more particularly, for controlled warming of battery 12. Circuit 18 includes a switching device 24 and a controller 26. Circuit 18 may also include a fuse 28.

Switching device 24 is provided to selectively short battery 12 in order to generate heat due to the internal resistance of battery 12. Device 24 is conventional in the art. In the illustrated embodiment, device 24 comprises a transistor. Device 24 may alternatively comprise a relay, however, as will be understood by those in the art. Device 24 is normally open and is coupled between poles 20, 22 of battery 12.

Controller 26 provides a means for generating a control signal to control switching device 24. Controller 26 generates the control signal responsive to a temperature of battery 12 and a voltage drop across poles 20, 22 of battery 12 and may do so in accordance with a predetermined algorithm. Controller 26 also provides means for measuring both the temperature and the voltage drop across poles 20, 22 and for comparing the measured temperature and voltage drop to redetermined temperatures and voltage drops, respectively. Controller 26 may comprise a microcontroller operating under the control of a set of programming instructions (i.e., software). Controller 26 may also include conventional measurement devices for measuring temperature and the voltage drop across poles 20, 22.

Fuse 28 is provided to prevent overheating of battery 12 if switching device 24 fails to open or controller 26 malfunctions. Fuse 28 is conventional in the art and is disposed between poles 20, 22 of battery 12, in series with switching device 24.

Figure 2:
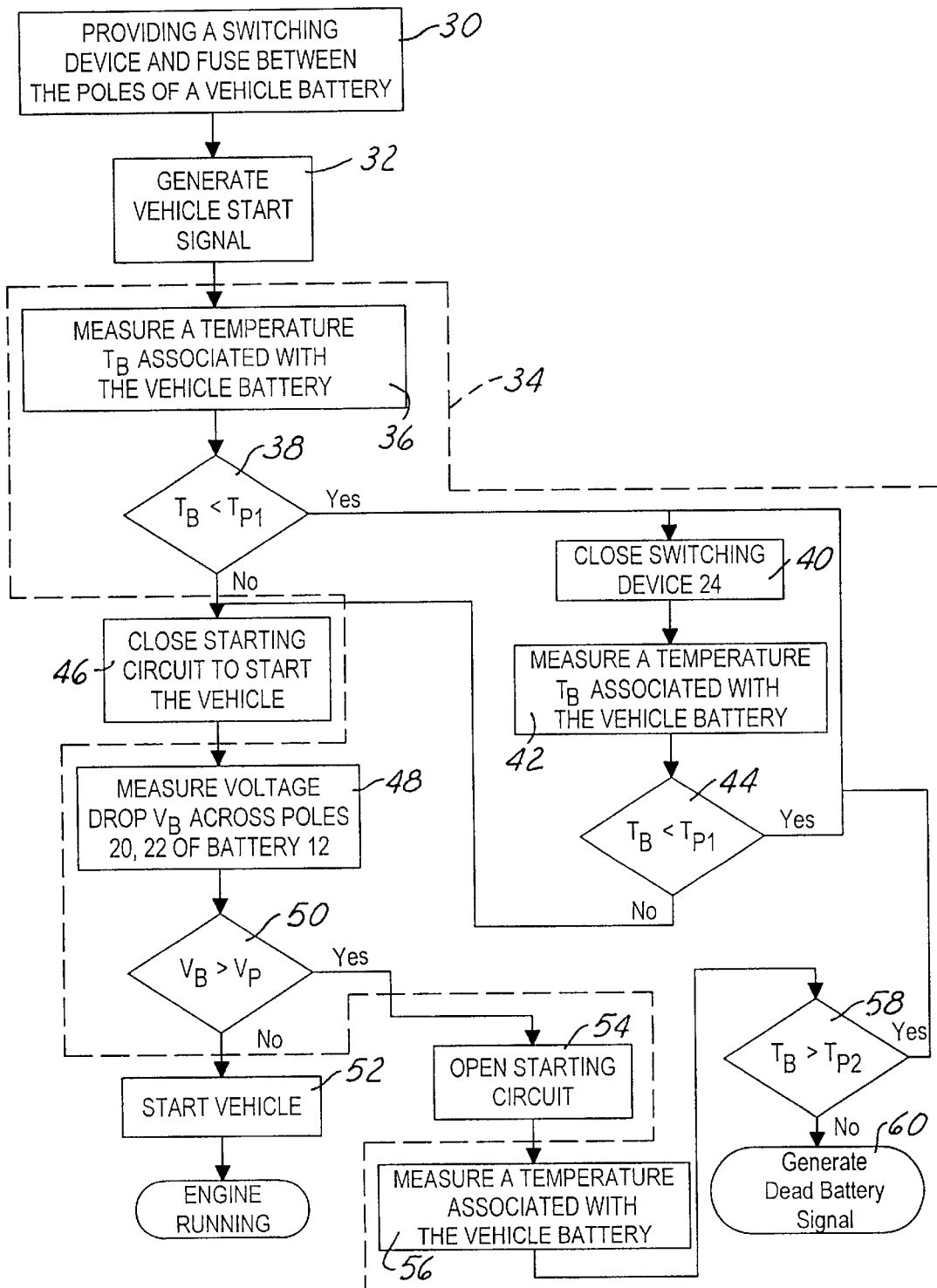
FIG. 2 is a flow chart diagram illustrating a method for controlling a vehicle starting circuit including a method of controlling a battery in accordance with the present invention.

Referring now to FIG. 2, a method for controlling a vehicle (and particularly starting a vehicle) is illustrated. The vehicle control method includes several steps that form a method for controlling a battery in accordance with the present invention. Both of the vehicle control and battery control methods may first include the step 30 of providing a switching device 24 and fuse 28 between the poles 20, 22 of the vehicle battery 12. The vehicle control method may then continue with the step 32 of generating a vehicle start signal. This step will generally be performed by the vehicle operator by, for example, turning a key.

The inventive battery control method next includes the step 34 of controlling switching device 24 in response to a temperature of battery 12 and a voltage drop across poles 20, 22 of battery 12. The step may include a plurality of substeps as illustrated by the broken line in FIG. 2. In particular, step 34 may begin with the substep 36 of measuring a temperature $T_B$ and the substep 38 of comparing the temperature $T_B$ to a predetermined temperature $T_{P1}$. The predetermined temperature $T_{P1}$ may be selected as a low temperature boundary below which battery 12 will not, or at least should not, be operated.

The vehicle and battery control methods next include the substep 40 of closing switching device 24 where the measured temperature $T_B$ meets a predetermined characteristic relative to the predetermined temperature $T_{P1}$. In the illustrated embodiment, switching device 24 is closed if the measured temperature $T_B$ is less than the predetermined temperature $T_{P1}$. It should be understood by those in the art, however, that this predetermined characteristic may be varied without departing from the spirit of the present invention. Referring to FIG. 1, controller 26 will generate a control signal to close switching device 24. Switching device 24 may be closed for a predetermined period of time. Referring again to FIG. 2, after this predetermined period the vehicle control and battery control methods continue with the substeps 42, 44 of measuring the temperature $T_B$ and comparing the measured temperature to the predetermined temperature $T_{P1}$.

This series of steps is repeated until the measured temperature $T_B$ does not meet the predetermined characteristic relative to the predetermined temperature $T_{P1}$.

Once the measured temperature $T_B$ attains a value greater than the predetermined temperature $T_{P1}$, the method of controlling the vehicle continues with the step 46 of closing starting circuit 14 to initiate a start of the vehicle. Referring to FIG. 1, powertrain controller 16 may receive a control signal from controller 26 directing powertrain controller 16 to attempt to start the vehicle. Powertrain controller 16 then generates a control signal and provides this signal to starting circuit 14.

In closing starting circuit 14, current is drawn from battery 12 thereby causing a voltage drop across poles 20, 22 of battery 12. Referring again to FIG. 2, the vehicle control and inventive battery control methods further include the substeps 48, 50 of measuring a voltage drop $V_B$ across poles 20, 22 of battery 12 and comparing the voltage drop $V_B$ to a predetermined voltage drop $V_P$. The predetermined voltage drop $V_P$ may be selected to be an upper boundary beyond which battery 12 will not, or at least should not, operate. If the measured voltage drop $V_B$ does not meet a predetermined characteristic relative to the predetermined voltage drop $V_P$, the method of controlling the vehicle continues with the step 52 of starting the vehicle in a predetermined fashion thereby causing the vehicle engine to run. If the measured voltage drop $V_B$ meets the predetermined characteristic relative to the predetermined voltage drop $V_P$, the method of controlling the vehicle may continue with the step 54 of opening starting circuit 14 to reduce current draw. In the illustrated embodiment, the voltage drop $V_B$ is compared to the predetermined voltage drop $V_P$ to determined whether the measured voltage drop $V_B$ is greater than the predetermined voltage drop $V_P$. Again, however, it will be understood by those in the art that this predetermined characteristic may be varied without departing from the spirit of the present invention.

The vehicle and battery control method may continue with the substeps 56, 58 of measuring a temperature $T_B$ and comparing the measured temperature to another predetermined temperature $T_{P2}$. Temperature $T_{P2}$ may be greater than predetermined temperature $T_{P1}$ and may be selected to indicate a temperature in which battery 12 should be operative. If the measured temperature $T_B$ fails to meet a predetermined characteristic relative to predetermined temperature $T_{P2}$, the vehicle and battery control methods may continue with the substep 60 of generating a signal indicative of a dead battery. As will be understood by those in the art, such a signal may take any of a variety of forms including audio signals, visual signals, or some combination thereof. In the illustrated embodiment, the measured temperature $T_B$ is compared to the predetermined temperature $T_{P2}$ to determined whether the measured temperature $T_B$ is greater than predetermined temperature $T_{P2}$. Again, however, those of skill in the art should understood that this predetermined characteristic may be varied without departing from the spirit of the present invention. If the measured temperature $T_B$ does meet the predetermined characteristic relative to predetermined temperature $T_{P2}$, the vehicle and battery control methods may repeat several of the previously described substeps beginning with the substep 40 of closing switching device 24.

A method in accordance with the present invention represents a significant improvement over conventional battery control methods. Conventional methods generally use ambient temperature as the only variable in controlled warming of the battery. These methods disregard the charge condition of the battery and, therefore, are subject to inefficiencies during warming of the battery. The inventive method accounts for the charge condition of the battery by measuring the voltage drop across the poles of the battery responsive to a current draw from the battery (e.g., by activating the vehicle starting circuit). The inventive method then uses this information together with the internal temperature of the battery to control warming of the battery.

I claim:

1. A circuit for controlling a battery, comprising:
   a switching device disposed between first and second poles of said battery and responsive to a control signal; and, a controller that generates said control signal in accordance with a predetermined algorithm responsive to a temperature and a voltage drop across said first and second poles.

2. The circuit of claim 1, further comprising a fuse disposed between said first and second poles of said battery.

3. The circuit of claim 2 wherein said fuse is in series with said switching device.

4. The circuit of claim 1 wherein said switching device comprises a transistor.

5. The circuit of claim 1 wherein said switching device comprises a relay.

6. The circuit of claim 1 wherein said switching device is closed when said temperature meets a first predetermined characteristic relative to a predetermined temperature and said voltage drop meets a second predetermined characteristic relative to a predetermined voltage drop.

7. The circuit of claim 6 wherein said temperature comprises an internal temperature of said battery.

8. A method of controlling a battery, comprising the steps of:
providing a switching device between first and second poles of said battery; and,
controlling said switching device responsive to a temperature and a voltage drop across said first and second poles.

9. The method of claim 8 wherein said controlling step is initiated responsive to a vehicle start signal.

10. The method of claim 8 wherein said switching device comprises a transistor.

11. The method of claim 8 wherein said switching device comprises a relay.

12. The method of claim 8, further comprising the step of providing a fuse in series with said switching device.

13. The method of claim 8 wherein said controlling step includes the substeps of:
measuring said temperature; and, comparing said temperature to a predetermined temperature.

14. The method of claim 8 wherein said controlling step includes the substeps of:
measuring said voltage drop; and,
comparing said voltage drop to a predetermined voltage drop.

15. The method of claim 8 wherein said controlling step includes the substep of closing said switching device when said temperature meets a first predetermined characteristic relative to a predetermined temperature and said voltage drop meets a second predetermined characteristic relative to a predetermined voltage drop.

16. The method of claim 15 wherein said temperature comprises an internal temperature of said battery.

17. A method of controlling a battery, comprising the steps of:
(a) providing a switching device between first and second poles of said battery;
(b) measuring a temperature;
(c) comparing said temperature to a first predetermined temperature;
(d) closing said switching device for a predetermined period of time when said temperature meets a first predetermined characteristic relative to said first predetermined temperature;
(e) repeating steps (b), (c), and (d) until said temperature does not meet said first predetermined characteristic relative to said first predetermined temperature;
(f) measuring a voltage drop across said first and second poles;
(g) comparing said voltage drop to a predetermined voltage drop;
(h) measuring said temperature if said voltage drop meets a second predetermined characteristic relative to said predetermined voltage drop;
(i) comparing said temperature to a second predetermined temperature;
(j) closing said switching device if said temperature meets a third predetermined characteristic relative to said second predetermined temperature;
(k) repeating steps (b), (c), (d), (e), (f), (g), (h), (i) and (j) until said voltage drop does not meet said second predetermined characteristic relative to said predetermined voltage drop.

18. The method of claim 17 wherein said controlling step is initiated responsive to a vehicle start signal.

19. The method of claim 17 wherein said temperature comprises an internal temperature of said battery.

20. The method of claim 17 wherein said second predetermined temperature is greater than said first predetermined temperature.

* * * * *